United States Patent Office 3,427,225
Patented Feb. 11, 1969

3,427,225
TEST COMPOSITION, DEVICE AND METHOD FOR DETECTING UREA IN AQUEOUS FLUIDS
Edward K. Harvill, deceased, late of Elkhart, Ind., by Jeanne T. Harvill, legatee and devisee, Elkhart, Ind., and Elsie J. Shrawder, Elkhart, Ind., assignors to Miles Laboratories, Inc., Elkhart, Ind., a corporation of Indiana
No Drawing. Continuation-in-part of application Ser. No. 383,996, July 20, 1964. This application June 5, 1967, Ser. No. 647,885
U.S. Cl. 195—103.5      17 Claims
Int. Cl. C12k 1/10

ABSTRACT OF THE DISCLOSURE

Improved test composition, device and method for detecting urea in aqueous fluids comprising urease, a pH indicator, a buffer for controlling the pH of the test composition, and an amide sensitizing agent. The test composition is preferably incorporated with a carrier member such as bibulous filter paper.

CROSS REFERENCES TO RELATED APPLICATIONS

This is a continuation-in-part application based on copending U.S. application Ser. No. 383,996, filed on July 20, 1964 and now abandoned.

BACKGROUND OF THE INVENTION

A means for the accurate determination of urea in fluids is of great importance not only in the early detection of physiological disorders by estimating the urea content of body fluids, but also in industrial process fluids where the urea concentration must be controlled within certain limits.

For example, a urea detecting means is extremely useful to an individual with a known kidney dysfunction who must control his diet or otherwise regulate his protein metabolism and must frequently be guided in this regard by a regular check on the concentration of his blood urea. But beyond its usefulness in regular testing in known kidney dysfunction by both patients and physicians, a urea indicator can also be used efficiently in routine urea analyses of body fluids in hospitals and physicians' offices.

In practice, the concentration of urea in blood, for example, is normally expressed in terms of blood urea nitrogen (BUN). This BUN value represents the amount of nitrogen present as urea and is approximately one-half of the total urea value. When either the urea or nitrogen value has been determined, the other value can be calculated therefrom.

The normal range of BUN values in individuals varies between 5–20 mg. percent. No significance is ordinarily attached to the lower values. However, elevations in BUN values generally indicate the presence of an abnormal condition. The most common cause of increased blood urea nitrogen is inadequate excretion, usually due to a kidney disease or urinary obstruction. For example, in acute nephritis the BUN level may vary from 25 mg. percent to as high as 160 mg. percent. Elevated urea retention also occurs with extensive parenchymatous destruction of kidney tissue, as in pyelonephritis, advanced nephrosclerosis, renal tuberculosis, renal cortical necrosis, renal malignancy, renal suppuration or chronic gout. Although BUN values may rise to as high as 400 mg. percent, they usually do not exceed 200 mg. percent.

Moreover, in the industrial area, urea is an important addition to process fluids such as plating baths and a quick means to determine the concentration of urea therein is of great value. Urea itself is used as a fertilizer and a quick means for assaying this material is important as a control measure in its production and use.

Such means for the determination of urea nitrogen in fluids, whether the fluids be industrial or physiological, is of greatest value, if the test method is conveniently rapid, reliable and simple enough for the technician to learn with ease. Moreover, in the case of medical diagnosis, the method must be accurate enough to reflect variations in the patient's condition. Additionally and importantly, the test method must be reproducible and the colors developed therein sufficiently distinct for good quantitation.

DESCRIPTION OF THE PRIOR ART

Procedures for the determination of urea in fluids are well known in analytical chemistry. One such procedure utilizes chemical hydrolysis and requires special apparatus not always available in a routine laboratory. Another procedure employs a direct colorimetric reaction of urea in a protein-free filtrate with an organic reagent such as diacetyl monoxime. Still another involves a test which depends on the action of the enzyme urease to convert urea to an ammonium salt which is measured by titration or nesslerization. These prior procedures have the disadvantage that they all require a considerable amount of skill and familiarity with complicated laboratory techniques.

More recently, sensitive enzymatic type test compositions for the colorimetric determination of urea in body fluids have been developed which greatly simplify these determinations. These particular test compositions are capable of producing color changes when contacted with a fluid containing urea and the various colors or hues produced correspond to various concentrations of urea present in the fluid. A particular embodiment of this method involves the incorporation or impregnation of the test composition onto bibulous paper strips.

Even though the enzymatic test method for detecting urea in fluids has contributed a considerable advance in the art, the colors developed therein tend to be somewhat erratic, especially when responding to low concentrations of urea in the fluid being analyzed. Moreover, when the test composition is impregnated onto or into a carrier the colors resulting from the contact of the carrier with a urea containing fluid tend to show poor diffusion and have a mottled appearance.

OBJECTS OF THE PRESENT INVENTION

It is therefore a primary object of this invention to provide an improved colorimetric detecting means which possesses high specificity and sensitivity for determining urea in fluids.

Another object of this invention is to provide a test composition which is capable of detecting urea when the quantity of fluid available is limited.

A further object is to provide a test method for detecting urea in fluids which is accurate and reproducible.

Another object is to provide a test composition incorporated with a carrier member in which the color developed therein when the carrier contacts a urea containing test fluid, is even in appearance and offers a facile comparison to an existing color chart in order to quantitate the urea present in the fluid.

SUMMARY OF THE PRESENT INVENTION

The composition of this invention specifically accomplishes these objects by providing a composition which comprises a unique combination of an enzyme system, a chromogenic indicator system, a buffer for providing the composition with an optimum pH environment and a sensitizing agent. The components of the composition in combination with this sensitizing agent cooperate in a manner such that when the enzyme system acts upon urea present in a fluid being tested, the indicator system is capable of undergoing a color change which is elegant in appearance and will accurately reflect the concentration of urea present in said fluid.

DESCRIPTION OF THE PREFERRED EMBODIMENTS

The basic enzymatic reaction underlying this invention is well known, especially in the instance where the enzyme system contains urease. Urease catalysts the hydrolysis of urea to produce principally ammonia and carbon dioxide, and/or ionized species thereof depending upon the prevailing pH conditions of the enzyme reaction system. This enzymatic hydrolysis of urea can be simply represented by the following reaction sequence:

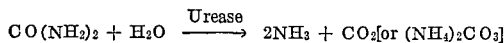

$$CO(NH_2)_2 + H_2O \xrightarrow{\text{Urease}} 2NH_3 + CO_2 [\text{or } (NH_4)_2CO_3]$$

A product of this hydrolysis can be determined by means of a chromogenic indicator system. For example, when the indicator system includes a pH indicator comprising a dye that is color sensitive to changes in pH, contact of said system with a product of this hydrolysis produces a color change in said dye which can be represented by the following reaction sequence:

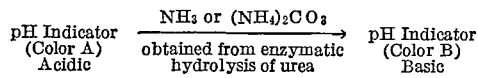

$$\underset{\substack{\text{(Color A)}\\\text{Acidic}}}{\text{pH Indicator}} \xrightarrow[\text{hydrolysis of urea}]{NH_3 \text{ or } (NH_4)_2CO_3 \text{ obtained from enzymatic}} \underset{\substack{\text{(Color B)}\\\text{Basic}}}{\text{pH Indicator}}$$

Although most of the common buffers may be utilized, in order to ensure maximum urea sensitivity while at the same time effecting the desired degree of pH control, a buffer capable of producing ammonium ions is preferably used in the composition of this invention. In using this ammonium ion producing buffer, it has been found that a relatively small amount of ammonium salt, which is released by the enzymatic hydrolysis of urea, produces, or at least allows, a relatively large change in the pH of the composition. The result of such a phenomenon is that the composition is sensitive to small incremental changes in urea concentration. If the buffer utilized is incapable of producing ammonium ions, the composition will be less sensitive to urea.

The buffer system is also utilized to provide the composition during use with an optimum pH environment for both the tautometric activity of the indicator and the enzymatic acivity of the urease. In regard to the indicator, the pH of the system is preferably initially set in a range between the midpoint of the transition interval of the indicator and a point adjacent to and on the acid side of this transition interval. The transition interval is defined as that pH range over which an indicator will exhibit a color change. For example, for bromthymol blue the transition interval lies between pH 6.0 and 7.6. Therefore, the midpoint of the transition interval of bromthymol blue is 6.8. In this illustration a pH adjacent to the transition interval of bromthymol blue and on the acid side thereof would be a pH of slightly below 6.0.

Although the above noted range is preferable, the pH of the system may initially be set to any point within the transition interval of the indicator whereby an increase in pH would cause a color change. Such an embodiment, however, utilizes a smaller proportion of the transition interval of the indicator and consequently makes quantitation over a broad range of urea concentrations more difficult.

The second consideration involved in selecting the optimum pH for the test method resides in the activity of urease under various pH conditions. In this regard it has been found that the optimum pH for urease depends on the particular buffer used, concentration of substrate, ionic strength, and so forth. Generally, however, it can be stated that although urease is active over a relatively broad pH range, it is preferable to utilize a buffer having a pH of from about pH 5 to about pH 9.

In practice, because of the impracticalities involved in measuring a dry test system such as when the present test composition is incorporated with a carrier member or when measuring pH when such a system is in use, as used herein, the above noted pH parameters apply to the test composition solutions used to prepare the composition or device.

In the preferred composition utilizing an ammonium ion producing buffer there are a variety of compounds which may be utilized in this invention to buffer the composition to the proper pH. These ammonium ion producing buffers may be generically classified as ammonium salt forming nitrogen compounds and include the ammonium salts of weak organic and inorganic acids as well as amines and amine salts of such acids. Moreover, the compound must be a solid or at least a high boiling point liquid at room temperature. Examples of such buffers include ammonium citrate, ammonium lactate, ammonium oxalate, ammonium benzoate, ammonium acetate, ammonium salicylate, ammonium stearate, ammonium propionate, ammonium butyrate, ammonium phosphate, tris(hydroxymethyl) aminomethane (TRIS), 2-amino-2-methyl-1, 3-propanediol, imidazole, 4-aminopyridine, 2-amino-2-methyl-1-propanol, hexamethylenediamine, substituted imidazoles, and acid salts thereof, and the like as well as mixtures of two or more of such buffers.

It has been found that tris(hydroxymethyl)aminomethane and its acid salts are preferable buffers for use in the present invention.

The amount or proportion of buffer used in the present test composition depends upon the concentration and buffering capacity of the particular buffer substance selected. This determination is well within the experimental purview of one skilled in the art of making and using chemical test systems.

Although a wide variety of pH indicators may be used in the present invention, considering the hereinabove noted pH parameters, the preferable indicators are those which have a transition interval within the optimum pH range for urease activity, i.e., pH 5 to pH 9. Exemplary of the indicators which may be used are bromthymol blue, bromcresol purple, dichlorosulphonphthalein, 6,8-dinitro - 2,4 - quinazolinedione, alizarin, 2 - (2,4 - dinitrophenylazo)-1-naphthol 3,6-disulfonic acid and the like.

It has now been found that the sensitivity and overall quality of the composition of this invention can be further improved by the addition of a sensitizing agent such as an aliphatic amide having a melting point below about 150° C. Therefore, as used herein, the term sensitizing agent is defined as an adjuvant to the composition which not only allows a more facile quantitation of urea but also improves the overall elegance of the strip and general appearance of the color produced by the presence of urea in the fluid under test. For example, the smoothness and uniformity of color developed by the test composition is dramatically improved by the addition thereto of a sensitizing agent. Preferred sensitizing agents include saturated and unsaturated aliphatic amides containing from about 2 to about 4 carbon atoms. Examples of such sensitizing agents include acetamide, propionamide, acrylamide, butyramide and the like.

The concentration of sensitizing agent used can be varied over a relatively wide range. Generally a concentration of about 0.5% to 10% and higher based on the total weight of the composition can be used without denaturing the urease. However, a concentration of sensitizing agent such as acetamide of about 1.5% to 4.0% is preferred.

The compositions of this invention can be incorporated into various forms of test devices. In a preferred embodiment, bibulous strips are impregnated with a composition of this invention. In use, the resulting test device is contacted with a fluid to be tested and the product of the enzymatic reaction, if any, is determined colormetrically. When the impregnated bibulous strip is contacted with a drop of the fluid being tested, the enzyme system having urease activity catalyzes the hydrolysis of the urea present in the fluid with the resulting formation of ammonia, carbon dioxide and possibly other reaction products. The quantity of urea hydrolyzed will cause a certain increment of pH increase which, in turn, causes a color change in the indicator. A correlation between color change and urea concentration can be made to provide a highly sensitive quantitative determination of urea. For example, when bromythymol blue is used in the composition of this invention, the various green hues between yellow and blue (the color change exhibited by bromthymol blue) can be correlated to correspond to different urea levels, thereby giving a clear visible index of the concentration of urea present in the blood.

Although the ingredients comprising the composition of this invention are preferably impregnated into a bibulous carrier such as paper, this invention can also be used in other forms such as, for example, tablets, pellets, powders and the like.

If desired, various additives may also be incorporated into the composition of this invention as protective, thickening or wetting agents. For example, thickening agents such as gelatin or wetting agents such as polyvinyl alcohols and polyethylene glycols can be used. A polyethylene glycol such as "Carbowax 4000" is particularly useful. Protective agents in the form of polymeric films can also be used to enhance the quality of the diagnostic composition of this invention when used with certain forms of test devices, for example, such as bibulous strips. Insert dyes to impart a uniform color background may also be used.

A semi-permeable polymeric film, for example, ethyl cellulose, can be used as a dialyzing membrane to keep the larger molecules present in the fluid being tested, such as hemoglobin in blood, out of contact with the diagnostic composition while at the same time permitting the remaining portions of the fluid, including any urea present, to pass through and contact the test composition. As a result, staining of the test composition by the hemoglobin in whole blood and the masking red color resulting from hemoglobin are avoided. The aforementioned large molecules can be readily washed or wiped off the polymeric film to permit observation of any resulting color change in the indicator. Further, the polymeric film protects the diagnostic composition from decomposition. Although ethyl cellulose is the preferred polymer, other semi-permeable film forming polymeric materials can be used if desired.

This invention is illustrated in greater detail in but is not limited by the following examples:

Example

Three batches of a test reagent solution were formulated to have the following composition:

Gelatin ---------------------------------g-- 0.5
Urease ---------------------------------g-- 0.5
Water ---------------------------------ml-- 11.5
Carbowax 4000 (polyethylene glycol) (4% aqueous solution) ---------------------------------ml-- 11.5
Bromthymol blue (1.6% aqueous solution) --ml-- 3.75
Ammonium citrate, dibasic (0.1 M aqueous solution) ---------------------------------ml-- 2.5

These batches were prepared by initially heating the water and dissolving the gelatin therein. The remaining constituents were then mixed and added to the gelatin solution. The first batch was designed I; the second, to which was added 1.0 g. acetamide prior to mixing with the gelatin solution, was designated II; and the third, to which was added 1.0 g. of acrylamide prior to mixing with the gelatin solution, was designated III. Test strips were prepared by dipping filter paper strips measuring 2 inches by ¼ inch into the above noted test reagent solutions and drying at a temperature of about 85° C. The dried impregnated strips were then coated with a polymeric film by dipping into a 1.25% by weight solution of ethyl cellulose in benzene and air drying until the benzene was completely evaporated.

The test strips were designed I, II, III according to the solution used. Each of these strips was then contacted with one drop blood samples containing various increments of urea (as analyzed by the diacetyl monoxime method), incubated for a two minute period at room temperature and the blood removed by washing with water. The developed colors were then compared to previously prepared color standards to effect a quantitation of the urea present in the blood. These results are listed below in Table I.

TABLE I

| Blood sample No. | Actual mg. percent urea in sample | Mg. percent detected by test strips | | |
|---|---|---|---|---|
| | | I | II | III |
| 1 | 10 | 10 | 10− | 10 |
| 2 | 14 | 15 | 12 | 10 |
| 3 | 22.1 | 20 | 20 | 20 |
| 4 | 23.8 | 30+ | 25 | 30− |
| 5 | 34.4 | 40 | 30 | 30 |
| 6 | 35.4 | 30 | 35 | 30 |
| 7 | 81.0 | 100− | 80 | 80 |
| 8 | 84.8 | 100 | 80 | 80 |
| 9 | 107.2 | 100− | 100 | 80 |
| 10 | 162.0 | 100 | 100+ | 100 |

As indicated by the above results, when no sensitizing agent was used (Test Strips I), seven of the ten results (70%) deviated by more than 5 mg. percent from the actual value; when acrylamide was used (Test Strips III) four test results (40%) deviated by more than 5 mg. percent; and when acetamide was used (Test Strips II) two of the test results (20%) deviated by more than 5 mg. percent.

Moreover, Test Strips I (no sensitizing agent), when contacted with urea, showed poor diffusion of color (mottled appearance) which made quantitation more difficult. Test Strips II and III, however, showed an even diffusion of developed color indicating a good diffusion to test reagent on the strip.

In summary, the present invention relates to an improved urea test composition, device and method for detecting urea in fluids. The composition in addition to utilizing urease, a pH indicator and a buffer system, comprises an amide sensitizing agent. The use of this agent results in a test method having superior quantitation and the test device prepared therewith shows an even diffusion of color when responding to the presence of urea allowing a facile quantitation of urea as well as making an elegant appearance.

What is claimed is:

1. A test composition for detecting urea present in a fluid comprising urease, a pH indicator, a buffer and, as a sensitizing agent, an aliphatic amide having a melting point below 150° C. and containing from about 2 to about 4 carbon atoms.

2. A test composition as in claim 1 wherein the sensitizing agent is selected from the group consisting of acetamide, propionamide, acrylamide and butryamide.

3. A test composition as in claim 1 wherein the concentration of sensitizing agent is from about 0.5% to about 10% by weight of total composition.

4. A test composition as in claim 3 wherein the concentration of sensitizing agent is from about 1.5% to 4.0% by weight.

5. A test device for detecting urea present in a fluid which comprises a carrier member having incorporated therewith a test composition comprising ureas, a pH indicator, a buffer and, as a sensitizing agent, an aliphatic amide having a melting point below about 150° C. and containing from about two to about four carbon atoms.

6. A test device as in claim 5 wherein the carrier member is a bibulous filter paper.

7. A test device as in claim 5 wherein the carrier member is coated with a polymeric film.

8. A test device as in claim 5 wherein the sensitizing agent is selected from the group consisting of acetamide, propionamide, acrylamide and butryamide.

9. A test device as in claim 5 wherein the concentration of sensitizing agent is from 0.5% to about 10% by weight of total composition.

10. A test device as in claim 5 wherein the concentration of sensitizing agent is from about 1.5% to 4.0% by weight.

11. A method for detecting urea present in a fluid which comprises contacting the fluid with a test composition comprising urease, a pH indicator, a buffer and, as a sensitizing agent an aliphatic amide having a melting point below about 150° C. and containing from about two to about 4 carbon atoms and observing the result thereby obtained.

12. A method as in claim 11 wherein the test composition is incorporated with a carrier member.

13. A method as in claim 11 wherein the fluid is blood and the carrier is coated with a polymeric film.

14. A method as in claim 11 which comprises the additional step of washing the carrier with water prior to observing the result thereby achieved.

15. A method as in claim 11 wherein the sensitizing agent is selected from the group consisting of acetamide, propionamide, acrylamide and butryamide.

16. A method as in claim 11 wherein the concentration of sensitizing agent is from about 0.5% to about 10% by weight of total composition.

17. A method as in claim 11 wherein the concentration of sensitizing agent is from about 1.5% to 4.0% by weight.

References Cited

UNITED STATES PATENTS 3,145,086   8/1964   Free et al. _____ 195—103.5

ALVIN E. TANENHOLTZ, *Primary Examiner.*

U.S. Cl. X.R.

23—230